Aug. 18, 1925.

L. C. WEINBERG ET AL 1,550,476

COUPLING FOR FLEXIBLE ELEMENTS

Filed Jan. 11, 1922

Patented Aug. 18, 1925.

1,550,476

UNITED STATES PATENT OFFICE.

LOWELL C. WEINBERG AND HARRY CRAY, OF DAYTON, OHIO.

COUPLING FOR FLEXIBLE ELEMENTS.

Application filed January 11, 1922. Serial No. 528,520.

*To all whom it may concern:*

Be it known that we, LOWELL C. WEINBERG and HARRY CRAY, citizens of the United States, residing at Dayton, in the county of Montgomery and State of Ohio, have invented certain new and useful Improvements in Couplings for Flexible Elements, of which the following is a specification.

This invention relates to a coupling for the adjacent ends of flexible elements, such as the elastic cords of airplane shock absorbers.

The primary object of the invention is to provide a coupling of simple construction which can be readily applied in such position as to securely hold the flexible element or elements with a grip which increases in strength as the stress increases.

Other objects of the invention, consisting of novel features of construction and arrangements of parts will become apparent as the description proceeds. The invention is hereinafter described in connection with the accompanying drawings, in which.

Figure 1:
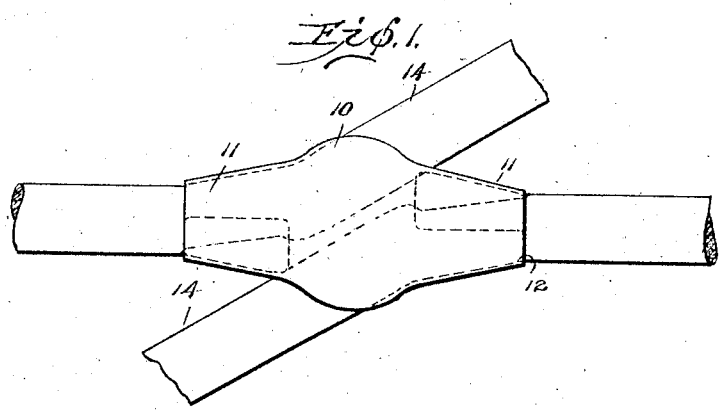
Figure 1 is a side elevation of the coupling as applied to the ends of an elastic cord shock absorber of an airplane.
Figure 2:
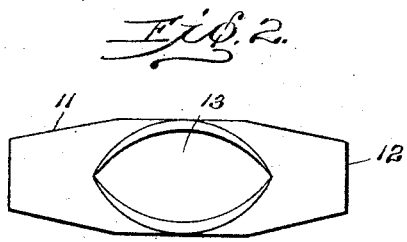
Figure 2 is a plan view of the coupling with the cords removed.
Figure 3:
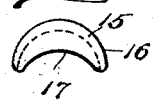
Figure 3 is a rear view of one of the wedge members.
Figure 4:
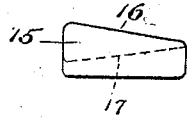
Figure 4 is a side elevation of one of the wedge members.
Figure 5:
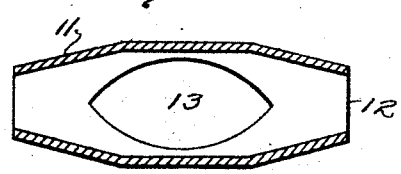
Figure 5 is a central longitudinal section through the coupling.

A shell-like body 10 is provided with oppositely extending cylindrical sleeves 11 which are formed with end conical openings 12 tapering from a large diameter at the inner end to a smaller outer diameter. The shell-like body 10 is expanded laterally, as shown in Fig. 1, and is provided with side openings 13 through which the ends of the coupled cords 14 are adapted to extend. A wedge member 15 is inserted in each sleeve 11. Each wedge member has an outer surface 16 conforming to the conical wall of openings 12 and an inner arcuate surface 17 adapted to engage the cylindrical surface of the cord or cable.

The wedge members being approximately in place, the ends of the elastic cord are threaded through the end openings 12 and drawn through the side openings 13, the wedge members moving backward during this operation so as to offer little obstruction thereto. The ends of the cords are now drawn through the coupling until the required tension is reached. Thereupon the ends are released and the wedge members 15 tend to move outwardly with the elastic cord, but as the cord and wedges travel into the sleeves the two are wedged together and locked firmly against further movement. After the locking action is complete, the ends of the cord may be cut off at the side openings 13, thereby making a neat coupling.

We claim:

1. A coupling comprising an oblong symmetrical double ended body of hollow formation having two end inlet openings and two side outlet openings all of which openings are designed to admit of the passage of the elements to be coupled together, and movable wedge like members within said body to clamp said elements.

2. A coupling comprising a hollow body having oppositely projecting sleeves with internally tapered inlet openings contracting in diameter toward their extremities and also having outlet openings in the sides thereof, said inlet and outlet openings being adapted to admit of the passage of the elements to be coupled together, and movable wedge-like members within said body to clamp said elements from withdrawal through the inlet openings.

In testimony whereof we affix our signatures.

LOWELL C. WEINBERG.
HARRY CRAY.